US008351016B2

(12) United States Patent
Nakagawa

(10) Patent No.: US 8,351,016 B2
(45) Date of Patent: Jan. 8, 2013

(54) DISPLAY DEVICE AND MANUFACTURING METHOD OF DISPLAY DEVICE

(75) Inventor: Hidetoshi Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 240 days.

(21) Appl. No.: 12/596,745

(22) PCT Filed: Dec. 3, 2007

(86) PCT No.: PCT/JP2007/073307
§ 371 (c)(1),
(2), (4) Date: Oct. 20, 2009

(87) PCT Pub. No.: WO2008/136150
PCT Pub. Date: Nov. 13, 2008

(65) Prior Publication Data
US 2010/0141883 A1  Jun. 10, 2010

(30) Foreign Application Priority Data
Apr. 23, 2007  (JP) ................... 2007-113157

(51) Int. Cl.
*G02F 1/13* (2006.01)
(52) U.S. Cl. ............ 349/192; 349/73; 349/74; 349/128; 445/24
(58) Field of Classification Search ............. 349/192, 349/73, 74, 12; 445/24
See application file for complete search history.

(56) References Cited

U.S. PATENT DOCUMENTS

| 5,132,819 | A | 7/1992 | Noriyama et al. |
| 6,335,771 | B1 * | 1/2002 | Hiraishi .................. 349/42 |
| 6,384,889 | B1 * | 5/2002 | Miyachi et al. ............ 349/143 |
| 6,548,831 | B1 | 4/2003 | Tokuhiro et al. |
| 6,710,825 | B2 * | 3/2004 | Kubo et al. .................. 349/48 |
| 6,753,253 | B1 | 6/2004 | Takahashi et al. |
| 7,110,075 | B2 * | 9/2006 | Tak et al. .................. 349/129 |
| 2002/0180920 | A1 | 12/2002 | Noh et al. |
| 2003/0107040 | A1 | 6/2003 | Tokuhiro et al. |
| 2005/0030459 | A1 * | 2/2005 | Song et al. .................. 349/129 |
| 2006/0012729 | A1 | 1/2006 | Tanaka et al. |
| 2006/0262261 | A1 | 11/2006 | Takeda et al. |
| 2010/0141883 | A1 | 6/2010 | Nakagawa |

FOREIGN PATENT DOCUMENTS

JP  62-038423  2/1987

(Continued)

OTHER PUBLICATIONS

U.S. Appl. No. 12/439,715, filed Mar. 3, 2009; Nakagawa.

(Continued)

*Primary Examiner* — Edward Glick
*Assistant Examiner* — Sang Nguyen
(74) *Attorney, Agent, or Firm* — Nixon & Vanderhye P.C.

(57) ABSTRACT

A display device 1 of the present invention includes a first conductive layer 20 and a second conductive layer 21 arranged across an insulating layer 24 from the first conductive layer 20. An overlap section 40 at which the first conductive layer 20 and the second conductive layer 21 overlap each other is provided. At least one of the first conductive layer 20 and the second conductive layer 21 includes a slit portion 210a that is arranged in the overlap section 40. The width of the slit portion 210a is set to be smaller at a medial area 82 except both end areas 81 of the slit portion 210a, than at the both end areas 81.

8 Claims, 18 Drawing Sheets

FOREIGN PATENT DOCUMENTS

| | | | |
|---|---|---|---|
| JP | 63-221325 | | 9/1988 |
| JP | 03-036750 | | 2/1991 |
| JP | 4-18730 | | 1/1992 |
| JP | 04-018730 | * | 1/1992 |
| JP | 5-232503 | | 9/1993 |
| JP | 7-28076 | | 1/1995 |
| JP | 07-092489 | | 4/1995 |
| JP | 11-340334 | | 12/1999 |
| JP | 2000-235190 | | 8/2000 |
| JP | 2001-083522 | | 3/2001 |
| JP | 2002-090775 | | 3/2002 |
| JP | 2003-021845 | | 1/2003 |
| JP | 2004-221207 | | 8/2004 |
| JP | 2004-347891 | * | 12/2004 |
| JP | 2006-030627 | | 2/2006 |

OTHER PUBLICATIONS

Office Action dated Feb. 2, 2011 from U.S. Appl. No. 12/439,715.
Supplementary European Search Report dated Dec. 10, 2010 corresponding to EP 07 74 1222.
International Search Report for PCT/JP2007/057786 mailed May 22, 2007.
Office Action from U.S. Appl. No. 12/439,715 mailed Oct. 18, 2011; Nakagawa.
International Search Report for PCT/JP2007/073307, mailed Dec. 25, 2007.

* cited by examiner

DISPLAY DEVICE AND MANUFACTURING METHOD OF DISPLAY DEVICE

This application is the U.S. national phase of International Application No. PCT/JP2007/073307 filed 3 Dec. 2007, which designated the U.S. and claims priority to JP Application No. 2007-113157 filed 23 Apr. 2007, the entire contents of each of which are hereby incorporated by reference.

TECHNICAL FIELD

The present invention relates to a display device and a manufacturing method of a display device.

BACKGROUND ART

A display device, such as a liquid crystal display device, an EL display device or a plasma display device, is conventionally known, in which pixel electrodes are arranged in a matrix on a transparent substrate. A voltage is applied individually to each pixel electrode in order to form an image. An active matrix driving method is known as a driving method for the display device. In the active matrix display device, gate bus lines (or scanning lines) and source bus lines (or signal lines) are arranged in a grid pattern on the transparent substrate, while switching elements such as TFTs are provided in the vicinities of the respective intersections of the gate bus lines and the source bus lines.

Each TFT includes a gate electrode branching from the gate bus line, a source electrode branching from the source bus line, and a drain electrode connected to the pixel electrode, for example. Further, a transparent substrate that includes a counter electrode is provided so as to face the transparent substrate that includes the pixel electrodes. Each pixel is driven by a voltage that is applied between the pixel electrode and the counter electrode based on a signal from the source bus line, when a selection signal is received from the gate bus line.

In the display device, when a leak has occurred between intersecting wiring lines such as a source bus line and a gate bus line, a signal cannot be transmitted properly beyond the short-circuited portion of the source bus line. This will cause a linear area that includes defective display (i.e., line defect). The techniques described in Patent Documents 1 and 2 are known as methods for fixing a defect at the intersection between wiring lines, for example.
Patent Document 1: JP-A-H7-28076
Patent Document 2: JP-A-2004-347891

Problem to be Solved by the Invention

Patent Document 1 discloses a technique that provides a large hole region on each overlapping portion of a wiring line, so that a short-circuited portion can be isolated by forming cut parts extending from the respective ends of the hole region by use of energy beam irradiation. Patent Document 2 discloses a technique that provides a plurality of parallel slits on each overlapping portion of a wiring line, so that the wiring line can be cut off at the slit-formed area.

According to the construction, laser cut of a conductive layer beyond the slit-formed area is required to isolate a leak spot that includes a film residue or a foreign substance larger than the slit width. In this case, the turning angle of laser cutting when the laser turns in direction may be limited to 90 degrees. If not limited, a 90-degree turn is preferable for facilitating the operation. When the conductive layer is thus cut out, the cutting may fail to eliminate a leak completely, due to some reason such as flying cut pieces. Particularly, the area corresponding to a turning point of the laser is prone to a defect of repair. Therefore, the turning point of the laser should be set to a point within intangible portions of the conductive layer, if feasible. That is, it is preferable to set the turning point of the laser to a point within the slits.

When described in relation to the slit width, the corner (corresponding to a turning point of the laser) is particularly prone to being left unfinished, if the slit width is set to be small. In this case, the cutting may fail to be reliably achieved, and therefore may result in a defect of repair. On the other hand, if the slit width is set to be considerably large for preventing a defect of repair, the wiring resistance may be inevitably high, resulting in degradation of display performance.

DISCLOSURE OF THE INVENTION

The present invention was made in view of the foregoing circumstances, and an object thereof is to provide a display device in which a leak spot or the like on a conductive layer (or on a wiring part) can be suitably fixed, without increasing the resistance, and further to provide a manufacturing method of the display device.

Means for Solving the Problem

In order to solve the above problem, a display device according to the present invention includes a first conductive layer, and a second conductive layer arranged across an insulating layer from the first conductive layer. An overlap section at which the first conductive layer and the second conductive layer overlap each other is provided. At least one of the first conductive layer and the second conductive layer includes a slit portion that is arranged in the overlap section. The width of the slit portion is set to be smaller at a medial area except both end areas of the slit portion, than at the both end areas.

According to the present display device, when a fault such as a leak is generated in the overlap section at which the first conductive layer and the second conductive layer overlap each other, the area of the fault can be separated off without leaving an unfinished cut portion, by cutting off a portion of the conductive layer, starting at an end area of the slit portion provided as a wider area than the medial area. Thereby, a highly reliable conductive feature can be provided, which enables provision of a high-quality display device.

On the other hand, the slit width is set to be smaller at the medial area of the slit portion, than at the both end areas of the slit portion. According to the construction, increase of the resistance of the conductive layer can be suppressed, compared to simply providing a slit portion of constant width equal to the width of the both end areas. Consequently, degradation of display performance may be prevented. Any size of defective area (or any size of foreign substance) can be separated off by cutting off a portion of the conductive layer, starting at an end area of the slit portion. That is, the starting point can be set to a point within areas of the slit portion except the medial area, when a portion of the conductive layer is cut off. Therefore, the medial area is immune to cutting operation. In view of this, the slit width is set to be smaller at the medial area of the slit portion, than at the both end areas, so that increase of the resistance of the conductive layer can be suppressed.

Note that the overlap section of the present invention also includes the periphery of a section at which the conductive layers overlap each other. Specifically, areas of the overlapping conductive layers in which a leak may occur due to intrusion of a foreign substance are included. A crossover section at which the conductive layers intersect each other can be an operative example of the overlap section.

EXPLANATION OF SYMBOLS

Figure 1:
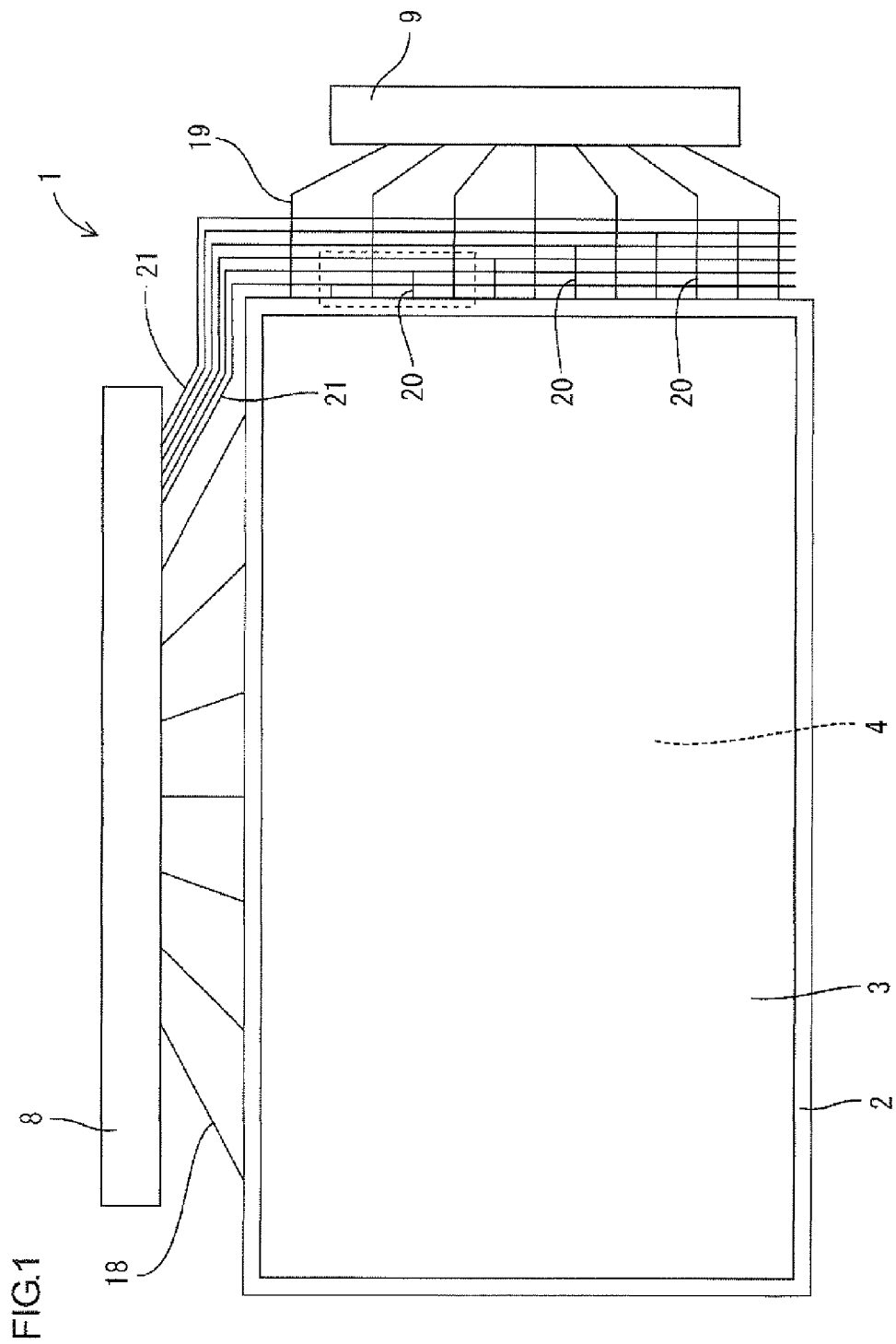
FIG. 1 is a plan view schematically showing the driver circuits and the wiring configuration of a liquid crystal display device according to an embodiment 1 of the present invention.

1: Liquid crystal display device (Display device), 20: Storage capacitor line (First conductive layer), 21, 51: Peripheral wiring line (Second conductive layer), 21a, 51a: Conductive layer, 24: Gate insulator (Insulating layer), 40: Crossover section (Overlap section), 81, 83: End area (Both end areas), 82, 84: Medial area, 210a, 510a, 710a: Slit portion, 510b, 710b: Cutout portion.

BEST MODE FOR CARRYING OUT THE INVENTION

In the liquid crystal display device 1 of the present embodiment, a liquid crystal layer 4 is sandwiched between a pair of substrates 2, 3 so as to fill the rectangular area formed on the inner side of a sealant 7.

The substrate 2 is provided as an element substrate, which includes TFTs 16 as switching elements (See FIG. 7), and further includes pixel electrodes 17 arranged in a matrix and connected to the respective TFTs 16.

On the other hand, the substrate 3 is provided as an opposite substrate, which includes a common electrode 6 arranged solidly on the substrate surface.

Further, a plurality of data lines 18 for supplying an image signal from a source driver 8 to each pixel, a plurality of scanning lines 19 for supplying a scan signal from a gate driver 9 to the TFT 16 of each pixel, and storage capacitor lines 20 for supplying an electrical signal from the source driver 8 for the capacitance of each pixel are provided on the element substrate 2. The storage capacitor lines 20 are connected, via contact holes (described below), to peripheral wiring lines 21 connected to the source driver 8.

Figure 7:
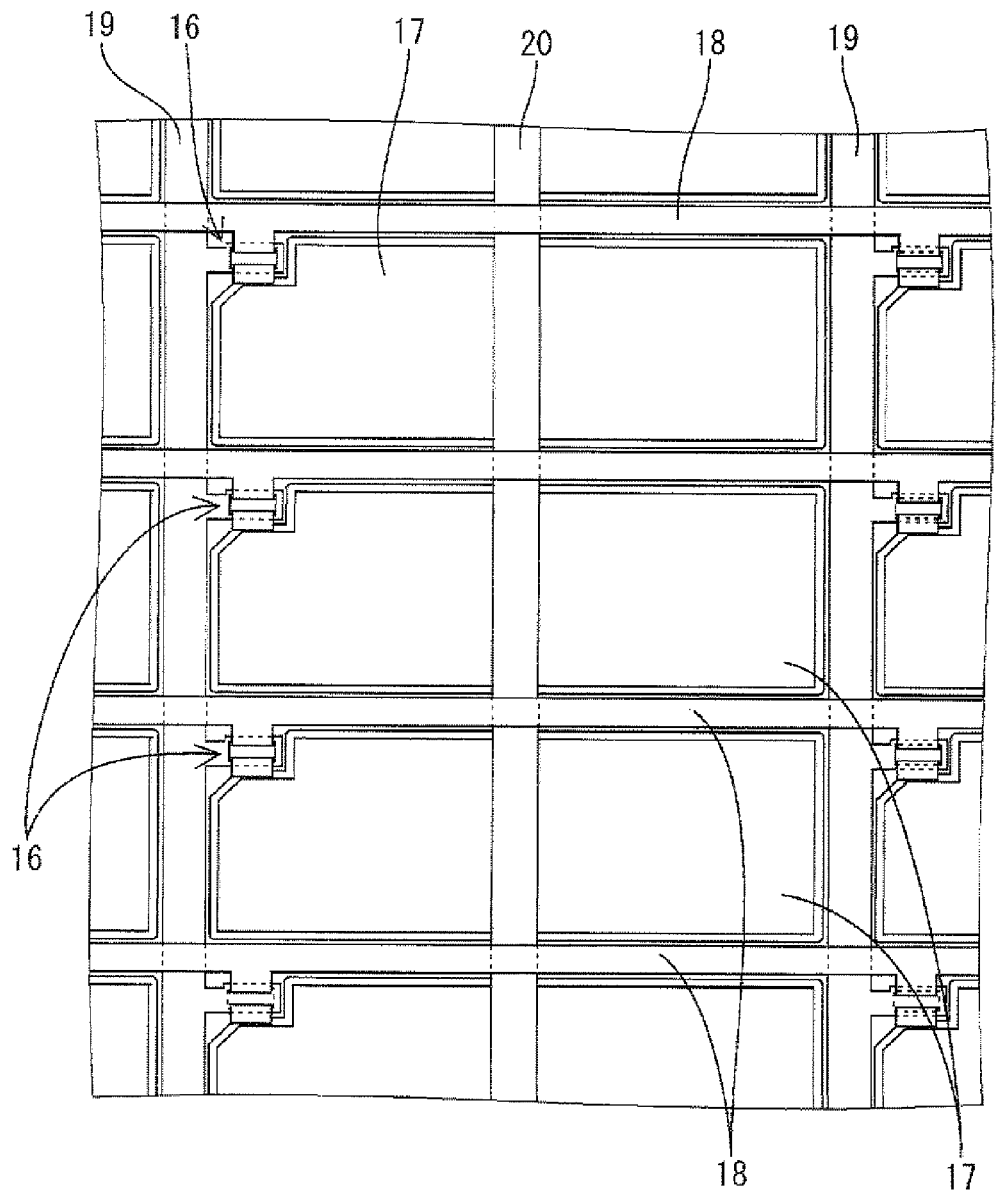
FIG. 7 is a schematic plan view showing the configuration of pixels of the liquid crystal display device according to the embodiment 1.

In each pixel section, as shown in FIG. 7, the pixel electrode 17 and the storage capacitor line 20 are connected in parallel. When the TFT 16 is turned ON, an image signal (or a drive voltage) is written into the pixel section. The voltage is held on the storage capacitor even after the TFT 16 turns OFF, due to the storage capacitor line 20 arranged in the pixel section. The storage capacitors are formed of a gate insulator (described below) that is arranged between the storage capacitor lines 20 and the pixel electrodes 17.

Figure 2:
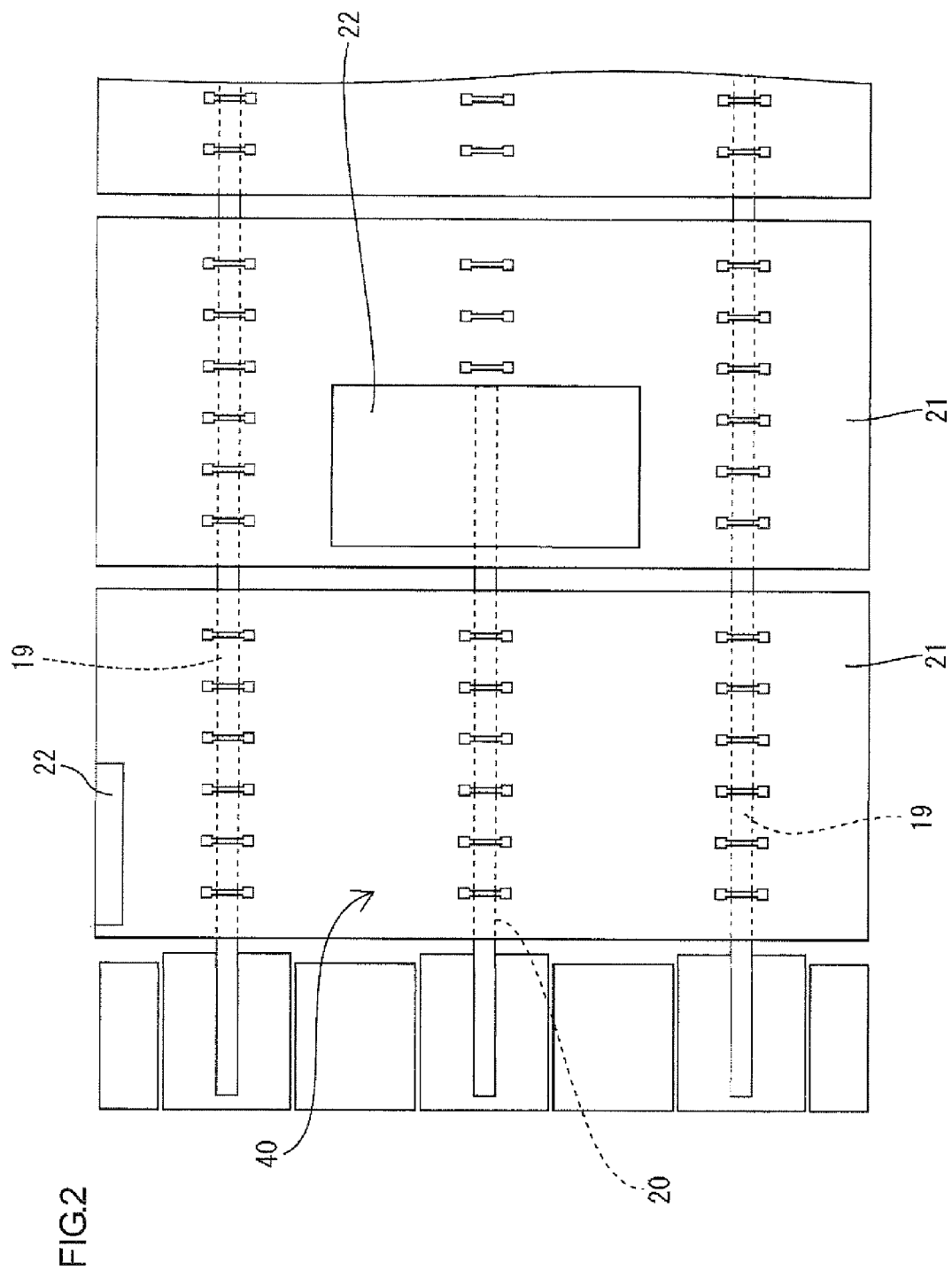
FIG. 2 is a partially-enlarged schematic plan view of FIG. 1.
Figure 3:
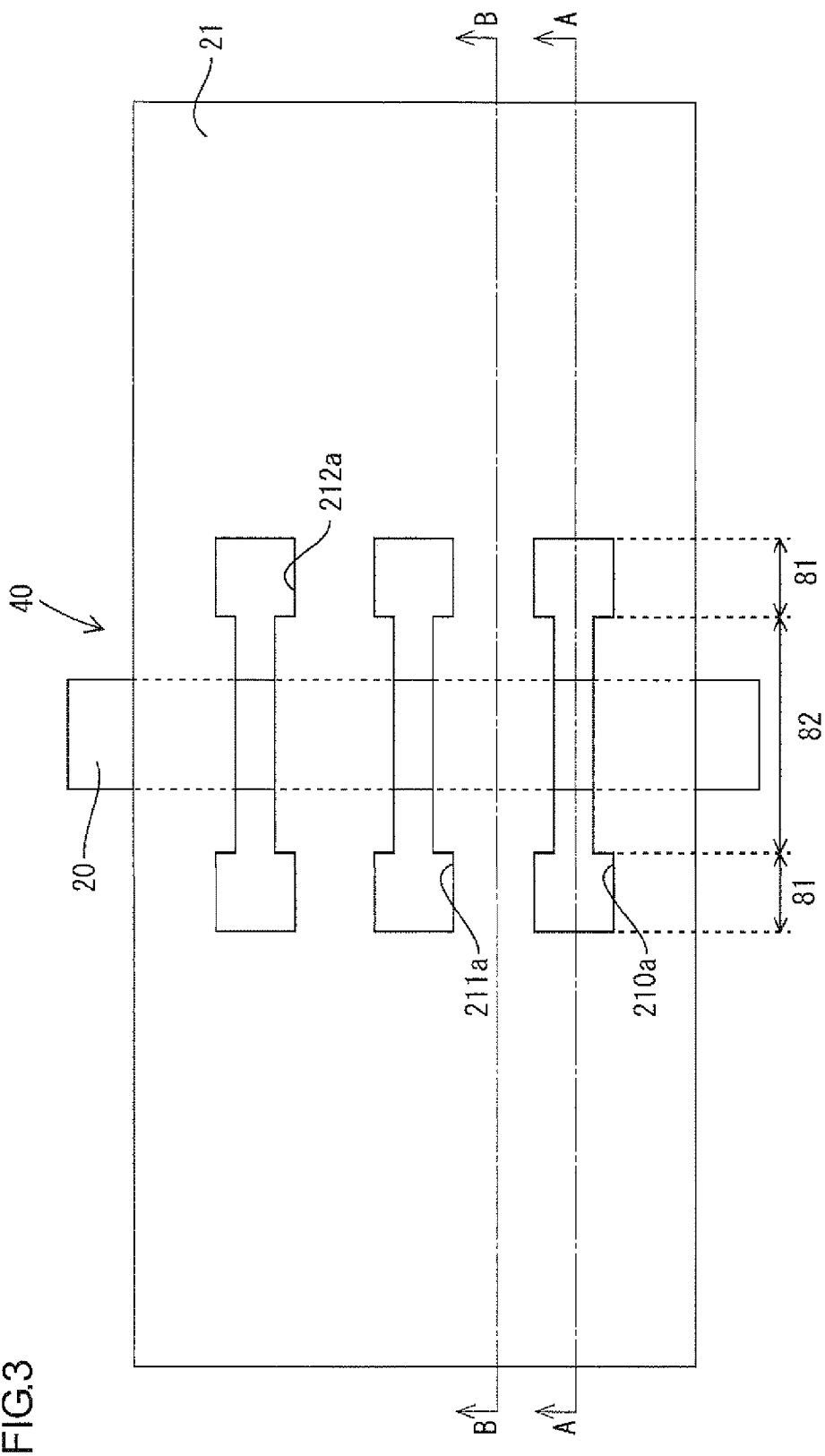
FIG. 3 is a partially-enlarged schematic plan view of FIG. 2.
Figure 4:
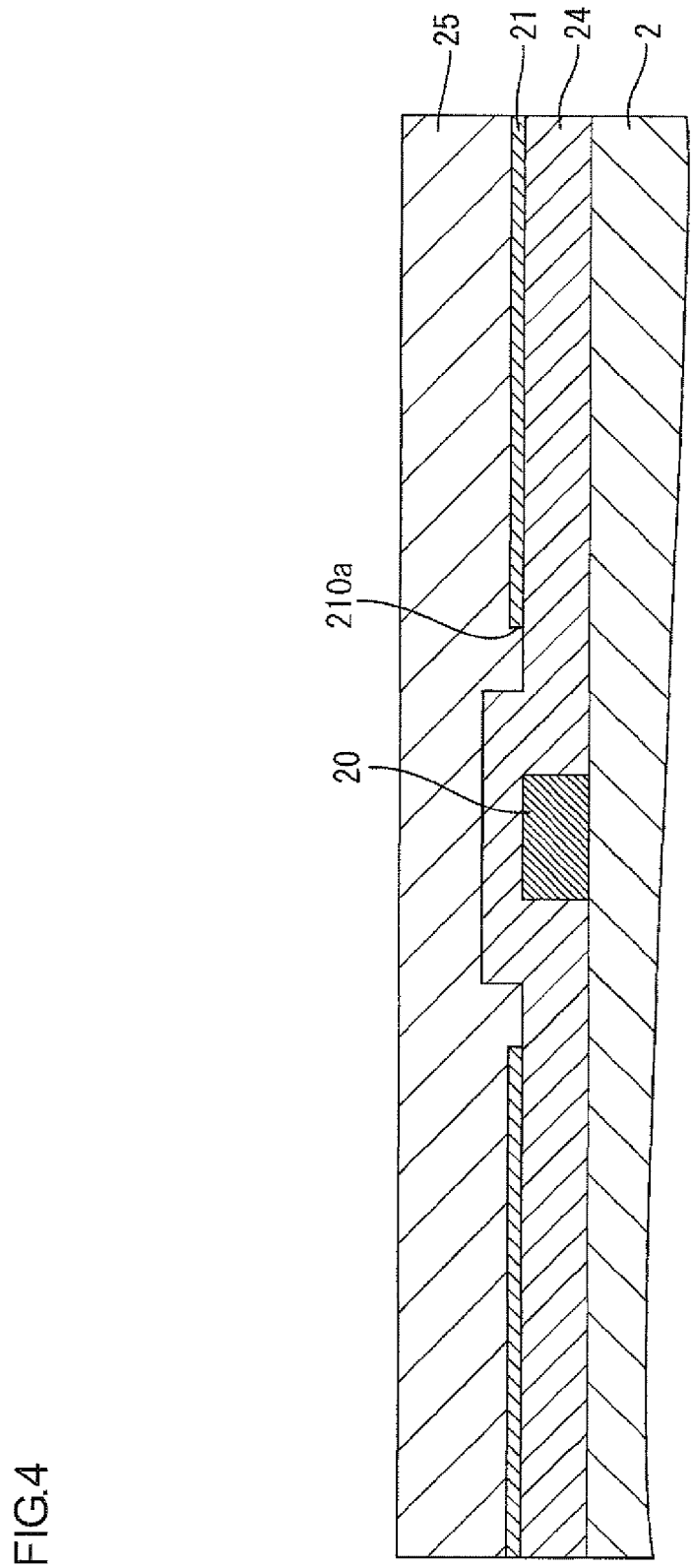
FIG. 4 is a schematic sectional view of FIG. 3 along the line A-A.
Figure 5:
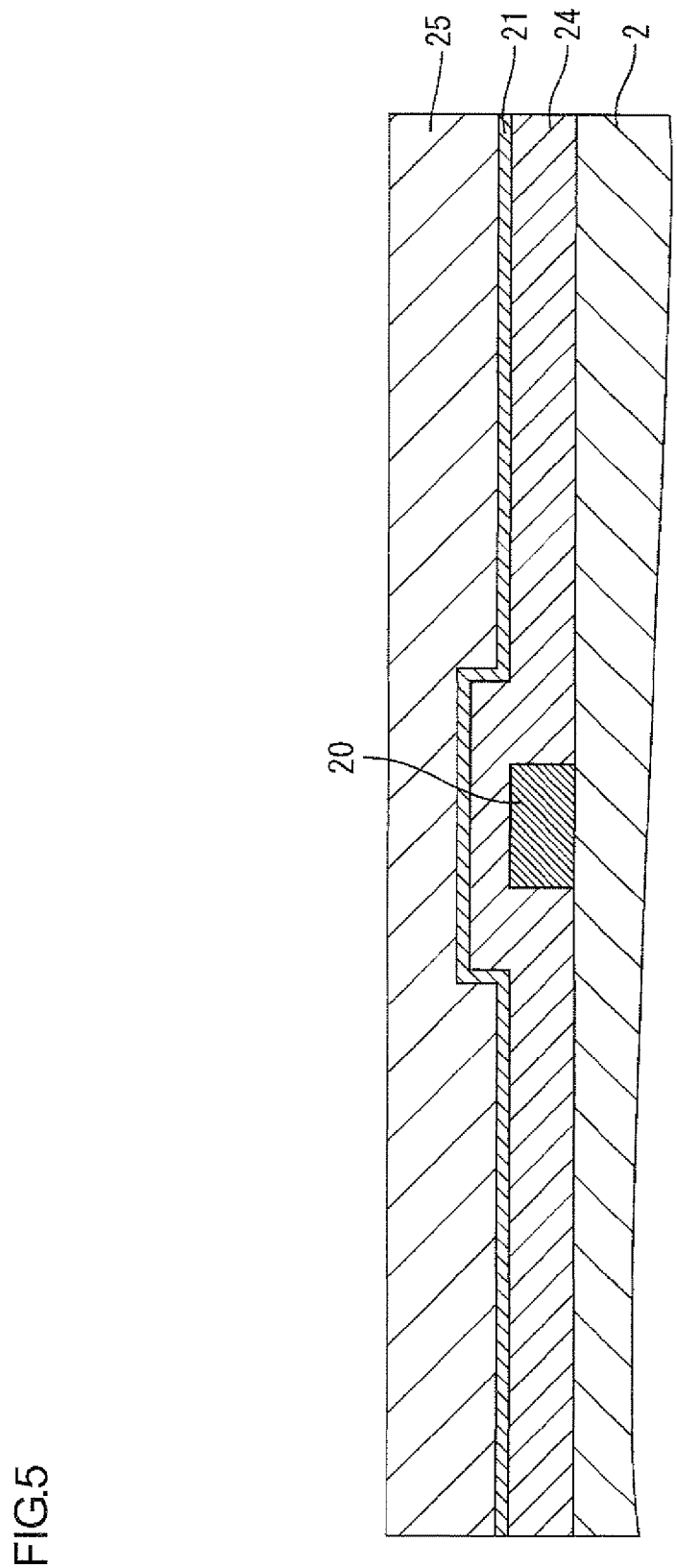
FIG. 5 is a schematic sectional view of FIG. 3 along the line B-B.

FIG. 2 is a schematic plan view that magnifies the area bounded by a dashed line in FIG. 1. FIG. 3 is a partially-enlarged plan view of FIG. 2. FIG. 4 is a sectional view of FIG. 3 along the line A-A. FIG. 5 is a sectional view of FIG. 3 along the line B-B.

The peripheral wiring lines 21 (i.e., a second conductive layer) are connected to the storage capacitor lines 20 (i.e., a first conductive layer) via contact holes 22, so as to be capable of providing an electrical signal from the source driver 8 (See FIG. 1) to the storage capacitor lines 20. The peripheral wiring lines 21 are formed of a wiring layer (or a conductive layer) that is formed by the same process as for the data lines 18. That is, the peripheral wiring lines 21 are formed of the same layer and the same material as the data lines 18. On the other hand, the storage capacitor lines 20 are formed of a wiring layer that is formed by the same process as for the scanning lines 19. That is, the storage capacitor lines 20 are formed of the same layer and the same material as the scanning lines 19. Consequently, the peripheral wiring lines 21 and the storage capacitor lines 20 are arranged in layers so as to form a lamination stack together with the gate insulator 24 arranged therebetween.

Referring to FIGS. 2 to 5, the peripheral wiring lines 21 and the storage capacitor lines 20 are arranged to intersect each other. In each crossover section 40 (or overlap section), fault repair slit portions 210a, 211a, 212a and the like (hereinafter sometimes collectively referred to as "slit portions 210a and the like") are provided, which are used for fixing a fault such as short circuit when the fault has occurred. The slit portions 210a and the like are formed on the peripheral wiring line 21.

The slit portions 210a and the like are formed of a plurality of parallel slits arranged evenly spaced apart. The slit length is set to a value between 35.0 μm and 50.0 μm (e.g., 40.0 μm). On the slit portions 210a and the like, the slit width is set to be smaller at the medial area 82 of each slit portion, i.e., at areas except both end areas 81 of each slit portion 210a or the like, than at the both end areas 81. Specifically, the both end areas 81 of the slit portions 210a and the like are individually formed into a rectangular shape, or specifically, into a square shape, on which each side thereof is set to a length between 6.0 μm and 10.0 μm (e.g., 8.0 μm). On the other hand, the slit width is set to a value between 4.0 μm and 6.0 μm (e.g., 4.0

μm) at the medial area 82 or at areas except the both end areas 81. The distance between adjacent slit portions (i.e., slit-to-slit distance, or pitch) is set to a value between 30.0 μm and 50.0 μm (e.g., 45.0 μm). The scanning lines 19 and the storage capacitor lines 20 can be formed of a conductive material having a Ti/Al/Ti structure, for example. The data lines 18 and the peripheral wiring lines 21 can be formed of a conductive material having a Ti/Al structure, for example. The gate insulator 24 arranged between the storage capacitor lines 20 and the peripheral wiring lines 21 can be formed of silicon oxide, or alternatively, can be formed of a laminated film, such as a laminated film of silicon oxide and a semiconductive material, a laminated film of silicon oxide, a semiconductive material and SOG (Spin On Glass), or a laminated film of silicon oxide and SOG (Spin On Glass). As shown in FIGS. 4 and 5, a passivation film 25 formed of silicon oxide and the like is provided on the peripheral wiring lines 21.

Figure 6:
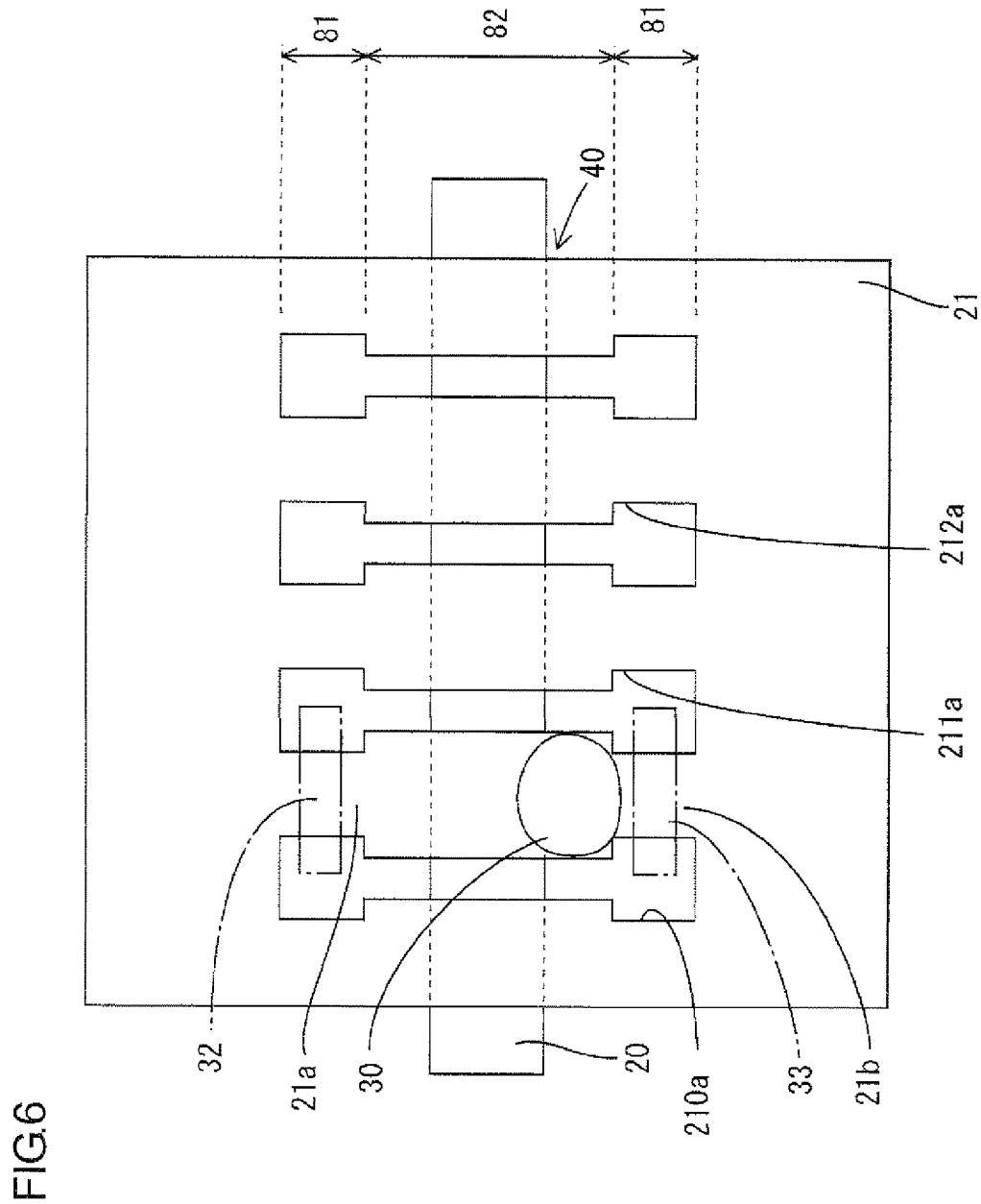
FIG. 6 is an explanatory diagram showing the operational effects of the liquid crystal display device according to the embodiment 1.

In the liquid crystal display device thus constructed, referring to FIG. 6, when a foreign substance 30 slips into a crossover section 40 at which a storage capacitor line 20 and a peripheral wiring line 21 intersect each other, for example, a fault such as a leak between the lines can be suitably fixed.

Specifically, the portions 21a, 21b of the conductive layer (or the peripheral wiring line 21) between the end areas 81 of the slit portions 210a, 211a are cut off by laser radiation, so that the slit portion 210a communicates with the slit portion 211a due to the laser-cut portions (or laser-irradiated portions designated by Symbols 32 and 33) as shown in FIG. 6. Consequently, the defective part attributable to the foreign substance 30 is electrically isolated, and thereby a failure caused by a fault such as a leak can be fixed.

Thus, the defective part can be separated off by a simple method, i.e., by cutting off the portions 21a, 21b of the conductive layer between the end areas 81 of the slit portions 210a, 211a so that the slit portions 210a, 211a communicate with each other.

Further, on the slit portions 210a and the like, the slit width is set to be larger at the end areas 81 of each slit portion 210a, 211a corresponding to the laser-irradiated portions, than at the medial area 82. Specifically, each end area 81 has a square shape on which each side thereof is set to a length of 8.0 μm. This construction enables improvement in precision of a cutting operation in the case of laser cutting. That is, the defective part can be cut off without leaving unfinished laser-cut portions. Consequently, a highly reliable conductive feature can be provided, which enables provision of a high-quality display device.

In contrast, the slit width is set to 4.0 μm at the medial area 82 of each slit portion 210a, 211a corresponding to the unirradiated portion. Thereby, the areas of slit portions can be reduced to be small, compared to simply providing slit portions of constant width equal to the width of the end areas 81. Consequently, increase of the resistance of the conductive layer can be suppressed, which may prevent degradation of display performance.

Thus, the present embodiment enables adequate repair of a leak spot or the like on a conductive layer (or on a wiring part) 20, 21 in the liquid crystal display device 1, without increasing the wiring resistance.

Next, a manufacturing method of the liquid crystal display device 1 will be explained.

The following explanation will mainly focus on a repair process of the manufacturing process.

First, a pair of substrates 2, 3 formed of light transmissive glass substrates should be prepared.

Then, scanning lines 19 and storage capacitor lines 20 are formed on the substrate 2, and a gate insulator 24 is formed on the lines. Further, data lines 18 and peripheral wiring lines 21 are formed on the gate insulator 24. Note that the storage capacitor lines 20 and the peripheral wiring lines 21 are formed to intersect each other out of the display area as shown in FIGS. 3 to 5.

In the process of forming the peripheral wiring lines 21, slit portions 210a and the like arranged in a pattern shown in FIGS. 3 to 5 are formed by mask etching using a photolithographic method. TFTs 16 and pixel electrodes 17 are further formed on the substrate 2, and an alignment film (not shown) is formed on the pixel electrodes 17.

On the other hand, a color filter (not shown) is formed on the substrate 3, if required. Further, a common electrode 6 is formed, and an alignment film (not shown) is formed on the common electrode 6.

Figure 8:
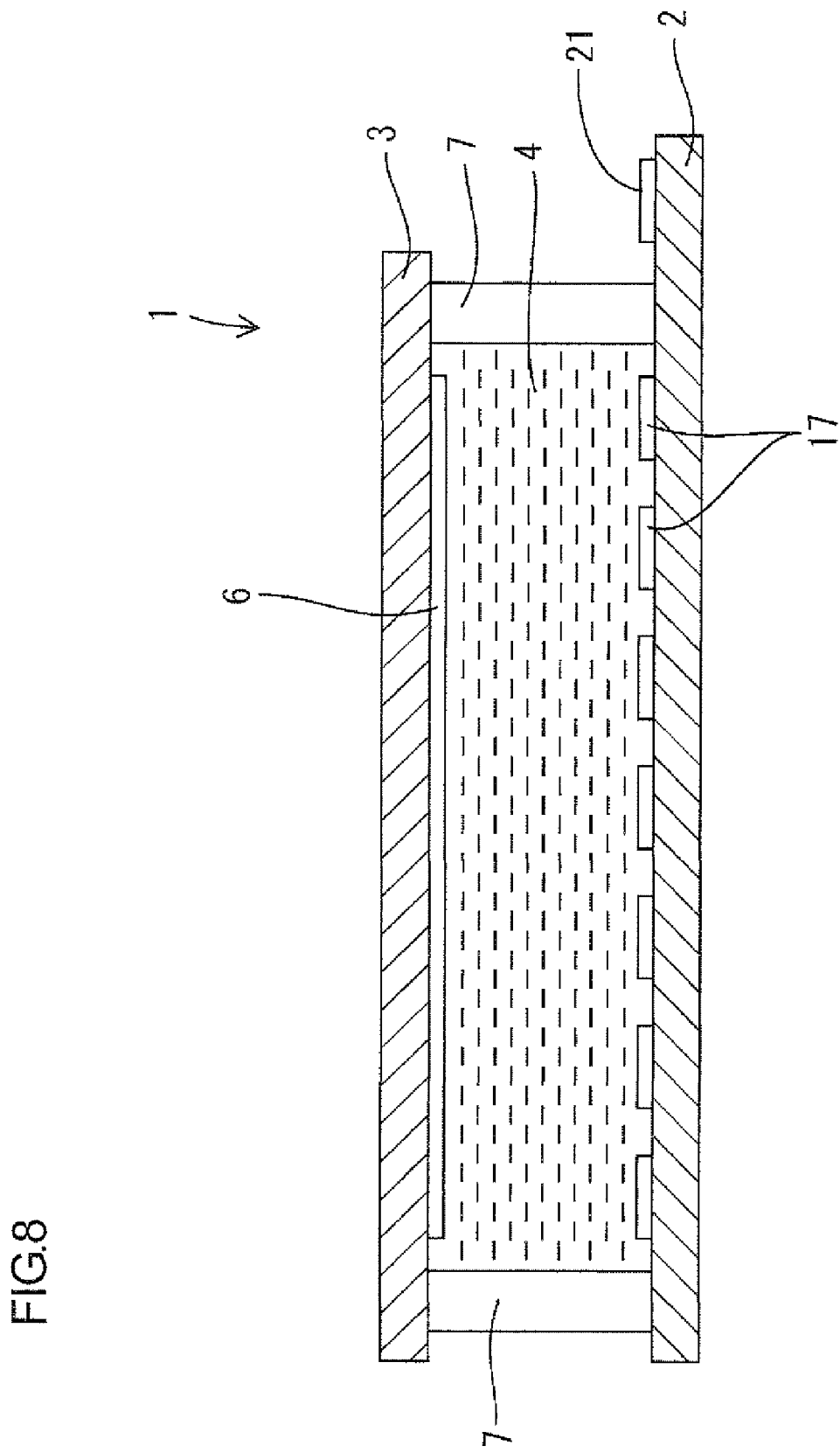
FIG. 8 is a diagram schematically showing the sectional configuration of the liquid crystal display device according to the embodiment 1.

After the electrodes and the like are thus formed on the substrates 2, 3, a sealant 7 is formed on at least one of the substrates 2, 3, and liquid crystal is dispensed into the inner region of the sealant 7. Then, the substrates 2, 3 are attached to each other via the sealant 7. A polarizing plate and the like are further placed, and then the manufacturing process of the liquid crystal display device 1 as in FIGS. 1 and 8 is completed.

In the manufacturing method of the present embodiment, if a foreign substance 30 shown in FIG. 6 slips into a crossover section 40 (See FIGS. 3 to 5) at which a storage capacitor line 20 and a peripheral wiring line 21 intersect each other, a repair process is performed for fixing a leak that may occur between the storage capacitor line 20 and the peripheral wiring line 21. In the repair process, some portions of the peripheral wiring line 21 connecting the adjacent slit portions 210a and the like are cut off by laser for repairing purpose.

Specifically, the portions 21a, 21b of the conductive layer (or the peripheral wiring line 21) between the end areas 81 of the slit portions 210a, 211a are cut off by laser radiation, so that the slit portion 210a communicates with the slit portion 211a due to the laser-cut portions (or laser-irradiated portions 32 and 33) as shown in FIG. 6. Consequently, the defective area attributable to intrusion of the foreign substance 30 is electrically isolated, and thereby a failure caused by a fault such as a leak can be fixed. In the present embodiment, the laser beam width is set to 4.0 μm during the repair process.

The manufacturing method of the present embodiment thus including the repair process enables provision of a highly reliable liquid crystal display device. This is due to the slit portions 210a and the like provided in each crossover section 40 at which the wiring lines 20, 21 intersect each other. Thereby, a defective area can be fixed by a simple method, i.e., by cutting off some portions of the conductive layer between the slit portions.

Further, on the slit portions 210a and the like, the slit width is set to be larger at the end areas 81 of each slit portion 210a, 211a corresponding to the laser-irradiated portions, than at the medial area 82. Specifically, each end area 81 is formed into a rectangular shape, on which each side thereof is set to a length equal to a value obtained by adding a value between 2.0 μm and 4.0 μm to the width (e.g., 4.0 μm in the present embodiment) of the laser beam, (or more specifically, it is formed into an 8.0 μm-square shape). This construction enables improvement in precision of a cutting operation in the case of laser cutting. That is, a defective part can be fixed without leaving unfinished laser-cut portions.

Figure 9:
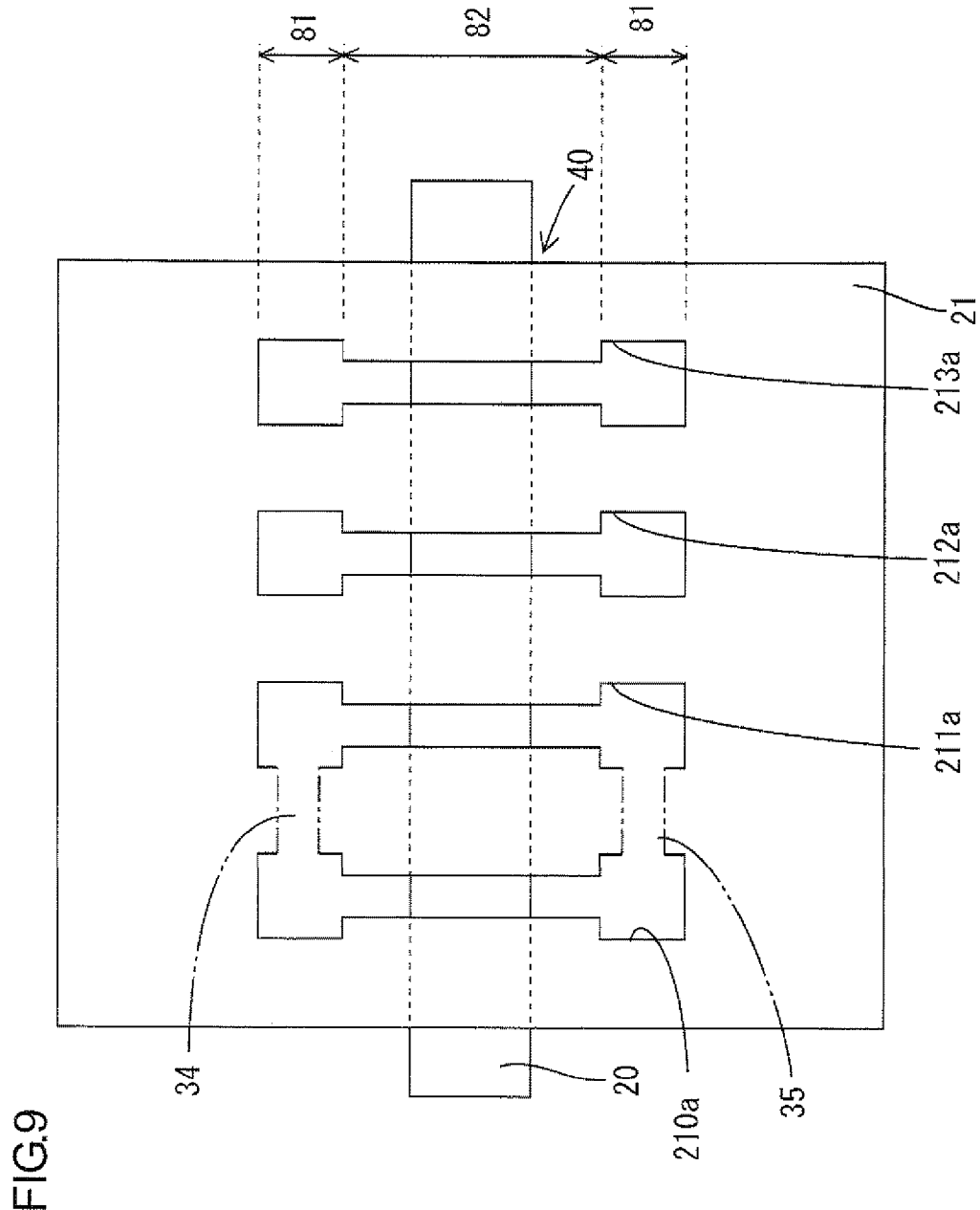
FIG. 9 is an explanatory diagram showing the operational effects of the end areas of slit portions having an adequate width according to the embodiment 1.

How the cutting precision is associated with the width of the end areas 81 of the slit portions 210a and the like will be explained in detail with reference to FIGS. 9 and 10. In the case that the end areas 81 of the slit portions 210a and 211a are individually formed into a rectangular shape on which each side thereof is set to a length equal to a value obtained by adding a value between 2.0 μm and 4.0 μm to the laser beam width, (or specifically, each end area is formed into an 8.0 μm-square shape as in the present embodiment, when the beam width is set to 4.0 μm), laser radiation can be applied for cutting so that the end areas 81 of the slit portions 210a, 211a communicate each other (See FIG. 9), and consequently the slit portions 210a, 211a can be reliably connected to each other due to laser-cut portions 34, shown by dashed-two dotted lines, without leaving unfinished laser-cut portions. Thus, the area bounded by the slit portions 210a, 211a and the laser-cut portions 34, 35 is electrically isolated, and thereby a failure caused by a fault such as a leak can be fixed.

Figure 10:
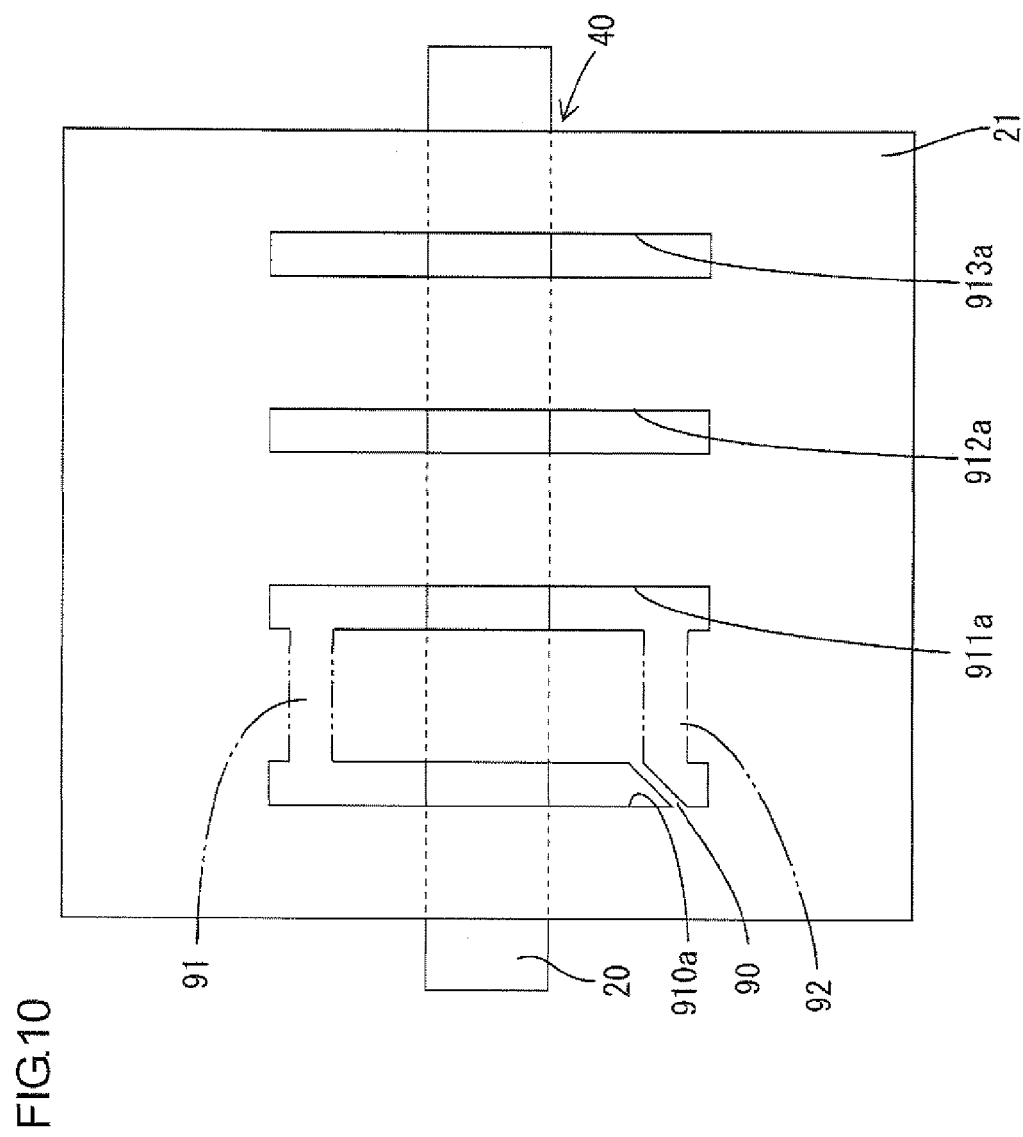
FIG. 10 is an explanatory diagram showing the problem of the end areas of slit portions having a constant width according to related art.

In contrast, referring to FIG. 10, in the case that the end areas of the slit portions 910a and 911a have sides having a length (e.g., 4.0 μm) less than a value obtained by adding 2.0 μm to the laser beam width, (e.g., a length less than 6.0 μm when the beam width is set to 4.0 μm), an unfinished laser-cut portion 90 may be left to form a bridge across an end area of the slit portion 910a as a result of applying laser radiation to the end area. In this case, the area bounded by the slit portions 910a, 911a and laser-cut portions 91, 92 can be conductive due to the unfinished laser-cut portion 90. That is, the area may fail to be electrically isolated, resulting in a defect of repair. For this reason, the end areas 81 of the slit portions 210a and the like corresponding to laser-irradiated portions should be formed to have a width equal to or larger than a predetermined value.

The laser beam width is typically set to a value between 2.0 μm and 8.0 μm during the repair process. In view of this, it is preferable that the end areas 81 of the slit portions 210a and the like corresponding to laser-irradiated portions have sides having a length between 6.0 μm and 10.0 μm.

On the other hand, the medial area 82 of each slit portion 210a, 211a, which is immune to laser irradiation during the repair process, is formed to have a smaller width (e.g., 4.0 μm in the present embodiment). Thereby, the areas of slit portions can be reduced to be small, compared to simply providing slit portions of constant width equal to the width of the end areas 81. Consequently, increase of the resistance of the conductive layer can be suppressed. Note that the present embodiment includes an inspection process for checking for the presence of a foreign substance 30 or the like prior to the repair process.

Embodiment 2

An embodiment 2 of the present invention will be explained with reference to FIGS. 11 and 12. The difference from the above embodiment 1 is that cutout portions are provided at a predetermined distance from respective slit portions. The other constructions are similar to the above embodiment. Therefore, the same parts as the above embodiment are designated by the same symbols, and redundant explanations are omitted.

Figure 11:
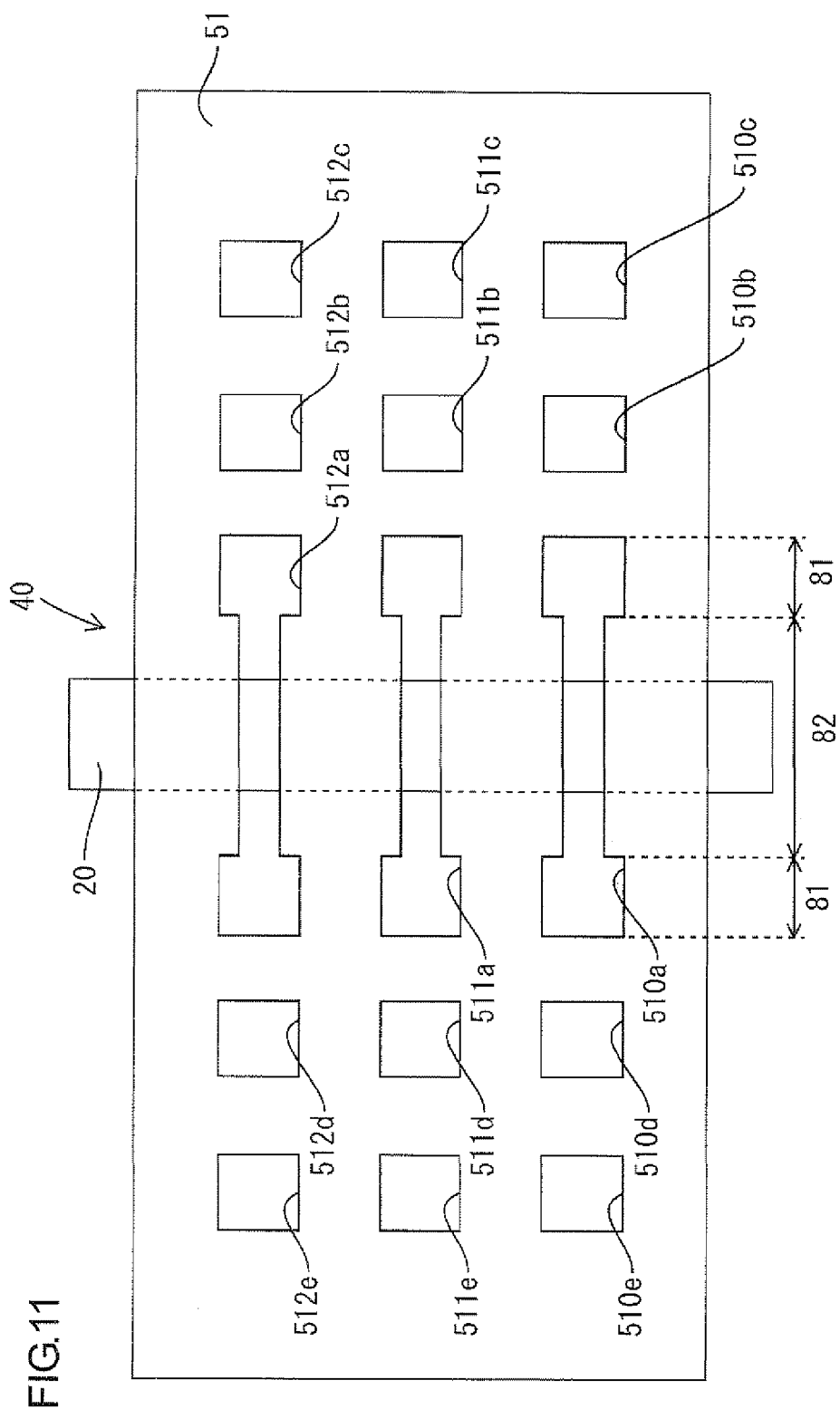
FIG. 11 is a partially-enlarged schematic plan view of a liquid crystal display device according to an embodiment 2 of the present invention.

FIG. 11 is a partially-enlarged plan view of a liquid crystal display device according to the present embodiment. FIG. 12 is an explanatory diagram showing the operational effects of the liquid crystal display device according to the present embodiment.

Referring to FIG. 11, in each crossover section 40 (or overlap section) at which a storage capacitor line (or first conductive layer) 20 and a peripheral wiring line (or second conductive layer) 51 intersect each other, fault repair slit portions 510a, 511a, 512a and the like (hereinafter sometimes collectively referred to as "slit portions 510a and the like") are provided, which are used for fixing a fault such as short circuit when the fault has occurred. The slit portions 510a and the like are formed on the peripheral wiring line 51. Further, in each crossover section 40, cutout portions Slob, 510c, 510d, 510e, 511b, 511c, 511d, 511e, 512b, 512c, 512d, 512e and the like (hereinafter sometimes collectively referred to as "cutout portions 510b and the like") are provided, which are arranged at a predetermined distance from the respective slit portions 510a, 511a, 512a and the like and along the longitudinal direction of the slit portions 510a, 511a, 512a and the like. The cutout portions 510b and the like are also provided as fault repair cutout portions used for fixing a fault, and are formed on the peripheral wiring line 51.

The slit portions 510a and the like have similar shapes to those of the embodiment 1, and are arranged in a similar manner to the embodiment 1. On the other hand, the cutout portions 510b and the like are arranged to be symmetrical with respect to the respective parallel slit portions 510a, 511a, 512a and the like, so that a plurality of cutout portions (e.g., a total of four cutout portions, two on the right side and two on the left side, in the present embodiment) are aligned along the longitudinal direction of each slit portion 510a, 511a, 512a or the like. That is, the cutout portions 510b and the like are scattered so as to form an array of rows and columns. Each cutout portion is formed into a rectangular shape, or more specifically, into a square shape, and each side thereof is set to a length between 6.0 μm and 10.0 μm (e.g., 8.0 μm). The distance between the first cutout portions 501b and 510d, which are arranged across the slit portion 510e from each other, is set to a length between 60.0 μm and 100.0 μm (e.g., 90.0 μm). Thus, the distance between these cutout portions is set to be equal to the integral multiple of the above slit-to-slit distance. The distance between adjacent cutout portions (e.g., the distance between the cutout portions 510e and 510d) is set to a length between 15.0 μm and 25.0 μm (e.g., 22.5 μm).

In the process of forming the peripheral wiring lines 51 (i.e., in the process of forming the second conductive layer), the slit portions 510a and the like and the cutout portions 510b and the like are formed by mask etching using a photolithographic method.

Figure 12:
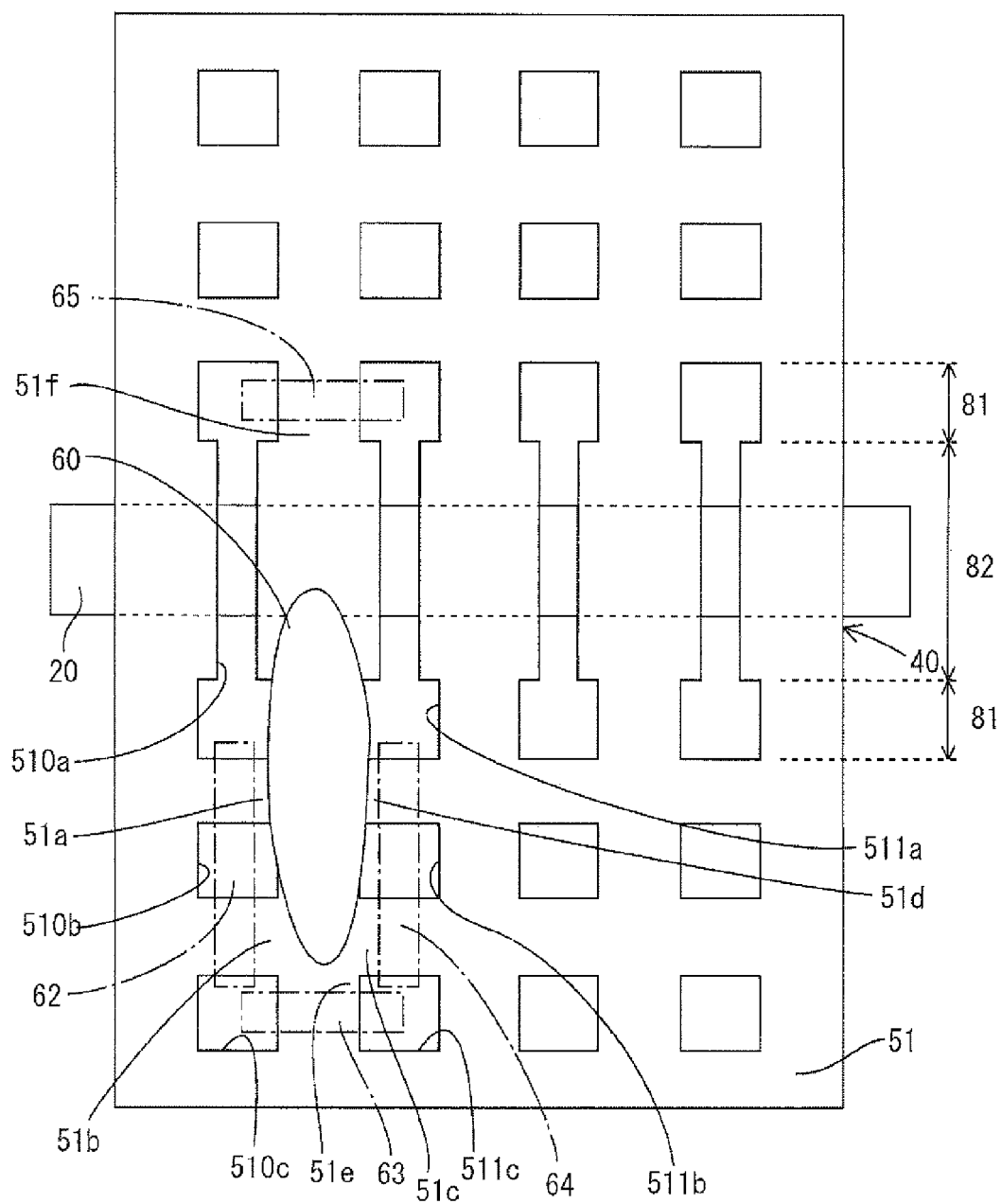
FIG. 12 is an explanatory diagram showing the operational effects of the liquid crystal display device according to the embodiment 2.

In the liquid crystal display device thus constructed, referring to FIG. 12, when a foreign substance 60 slips into a crossover section 40 at which a storage capacitor line 20 and a peripheral wiring line 51 intersect each other, for example, a fault such as a leak between the lines can be suitably fixed. Specifically, a portion 51a of the conductive layer (or the peripheral wiring line 51) connecting an end area 81 of the slit portion 510a and the cutout portion 510b is cut off by laser radiation, so that the end area 81 of the slit portion 510a communicates with the cutout portion 510b due to the laser-cut portion (or laser-irradiated portion designated by Symbol 62) as shown in FIG. 12. Similarly, a laser-cut portion (or laser-irradiated portion 62) is formed, so that a portion 51b of the conductive layer connecting the cutout portion 510h and the cutout portion 510c is cut off. Further, a laser-cut portion (or laser-irradiated portion 63) is formed, so that a portion 51e of the conductive layer connecting the cutout portion 510c and the cutout portion 511c is cut off. A laser-cut portion (or laser-irradiated portion 64) is formed, so that a portion 51c of the conductive layer connecting the cutout portion 511b and the cutout portion 511c is cut off. A laser-cut portion (or laser-irradiated portion 64) is formed, so that a portion 51d of the conductive layer connecting an end area 81 of the slit portion 511a and the cutout portion 511b is cut off. A laser-cut portion (or laser-irradiated portion 65) is formed, so that a portion 511 of the conductive layer connecting an end area 81 of the slit portion 511a and an end area 81 of the slit portion 510a is cut off. Consequently, the defective part attributable to the foreign substance 60 is electrically isolated, and thereby a failure caused by a fault such as a leak can be fixed.

According to the construction, the cutout portions 510b and the like linearly aligned with the slit portions 510a and the like are provided so that a defective area can be separated off. Thereby, a defect over a large area can be fixed, and therefore intrusion of a relatively-large foreign substance can be treated. Particularly compared to simply increasing the lengths of the slit portions 510a and the like in order to enable repair of a larger defective area, increase of the resistance of the peripheral wiring lines 51 can be suppressed according to the present construction, which may prevent degradation of display performance.

Further, in the present embodiment, the slit portions 510a and the like are arranged parallel to one another, while the cutout portions 510b and the like are arranged to be aligned with the respective slit portions 510a and the like. That is, the cutout portions 510b and the like are arranged in an array of rows and columns.

Due to the parallel arrangement of the slit portions 510a and the like and further due to the cutout portions 510b and the like aligned with the parallel slit portions 510a and the like, the above cutting operation can be advanced in the longitudinal direction of the slit portions 510a and the like, or a direction (i.e., the array direction of the slit portions 510a and the like) intersecting with the longitudinal direction. Thus, the cutting operation is facilitated. Specifically, during the laser cutting operation described above, the laser scanning can be advanced in either of the vertical and horizontal directions which intersect each other at an angle of 90 degrees. Thus, the laser scanning is facilitated, and consequently the precision of irradiation can be improved. Specifically, the portions of the peripheral wiring line 51 connecting the end areas 81 of the slit portions 510a and the like and the cutout portions 510b and the like can be cut off along the longitudinal direction of the silt portions 510a and the like. The portions of the peripheral wiring line 51 connecting the end areas 81 of the parallel slit portions 510a and the like, or the portions of the peripheral wiring line 51 connecting the cutout portions 510b and the like arranged in a line can be cut off along the array direction of the slit portions 510a and the like.

Each of the cutout portions 510b and the like has a rectangular shape with 6.0 μm to 10.0 μm sides, or specifically, a square shape with 8.0 μm sides. Thereby, the precision of laser cutting can be improved. Consequently, a defective part can be cut off without leaving unfinished laser-cut portions.

In the case where isolation of a foreign substance spot is achieved by laser cutting during a repair process as in the manufacturing method of the present embodiment, the laser cutting can be advanced while involving 90-degree turns of the scanning laser (or scanning light), due to the rectangular (specifically, square in the present embodiment) cutout portions 510b and the like, which are arranged in an array of rows and columns so as to be aligned with the respective slit portions 510a and the like. That is, referring to FIG. 12, when each laser-cut portion 62, 63, 64 is formed by laser radiation so that a portion of the peripheral wiring line 51 connecting between the cutout portions 510b and the like arranged in an array of rows and columns is cut off, the laser scanning direction can be set to either of the vertical and horizontal directions which intersect each other at right angles. Therefore, the laser cutting can be achieved by laser scanning that involves 90-degree turns. Further, a turning point at which the scanning laser turns in direction can be set to a point within any of the cutout portions 510b and the like. Thereby, a cutoff defect at the turning point can be prevented. That is, the turning point can be set to a point within intangible portions of the peripheral wiring lines 51, and therefore the scanning laser can turn in direction while not cutting a wiring line portion. Consequently, a cutoff defect likely generated at the turning point can be prevented.

Shown above are embodiments of the present invention. However, the present invention is not limited to the embodiments explained in the above description made with reference to the drawings. The following embodiments may be included in the technical scope of the present invention, for example.

(1) In the above embodiments, the slit portions 210a and the like, or the slit portions 510a and the like and the cutout portions 510b and the like are provided on the peripheral wiring lines 51, but rather may be provided on the storage capacitor lines 20.

(2) In the above embodiments, the slit portions 210a and the like, or the slit portions 510a and the like and the cutout portions 510b and the like are provided in a crossover section at which a peripheral wiring line 51 and a storage capacitor line intersect each other. However, slit portions and cutout portions can be provided in a crossover section at which various other conductive layers intersect each other.

(3) In the above embodiments, a liquid crystal display device is shown for illustrative purposes. However, the construction according to the present invention can be employed on another type of display device such as an EL display device or a plasma display device.

Figure 13:
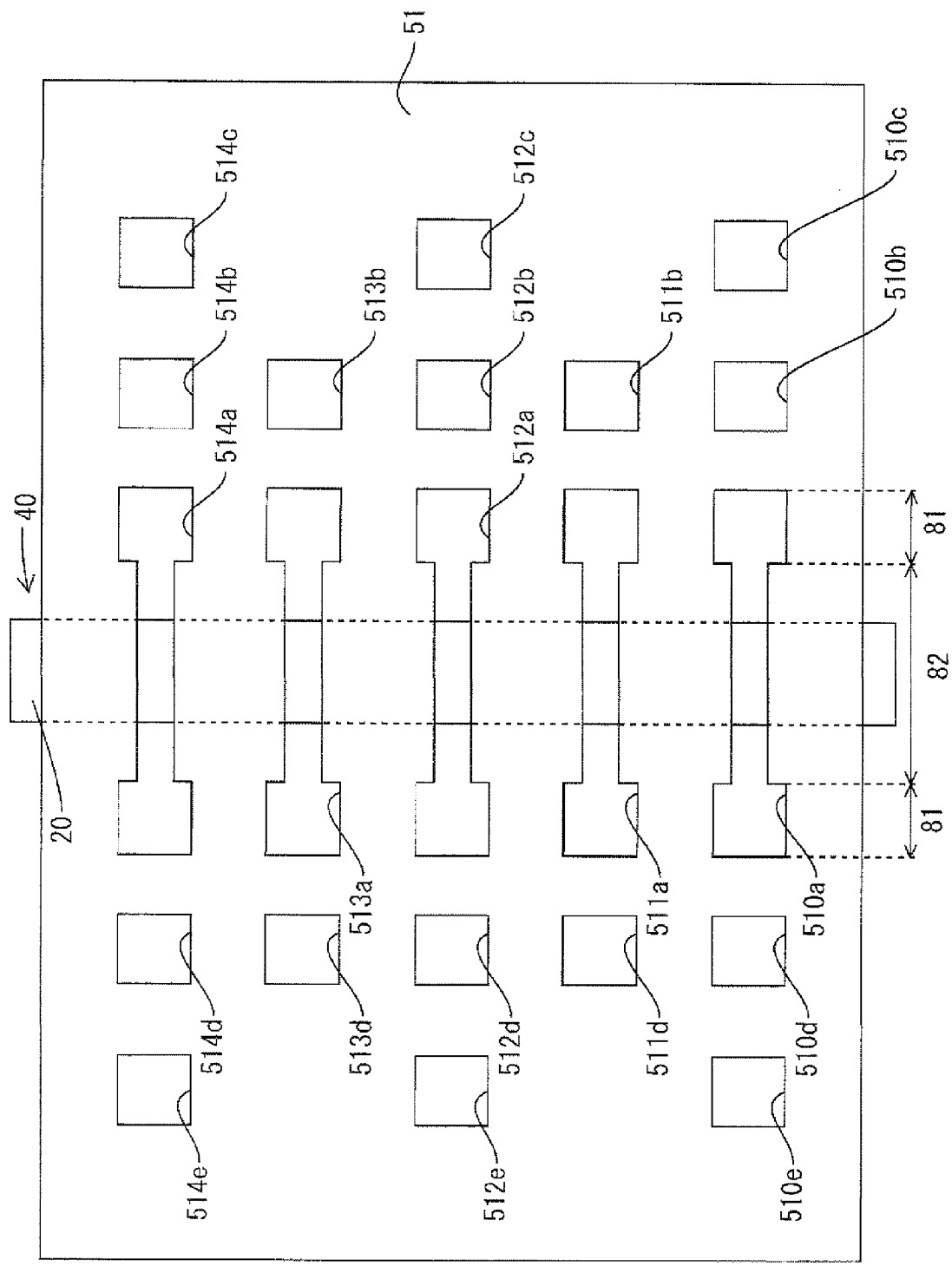
FIG. 13 is a diagram schematically showing a modification of cutout portions.

(4) In the above embodiment, all the cutout portions are arranged evenly spaced apart. However, some of the cutout portions in the second or subsequent columns may be selectively eliminated, for example. Specifically, the arrangement may be formed as shown in FIG. 13, in which the cutout portions aligned with the first slit portion 510a include cutout portions 510b, 510d in the first columns and cutout portions 510c, 510e in the second columns, while the cutout portions aligned with the second slit portion 511a include cutout portions 511h, 511d in the first columns, but the cutout portions in the second columns are eliminated therefrom.

Figure 14:
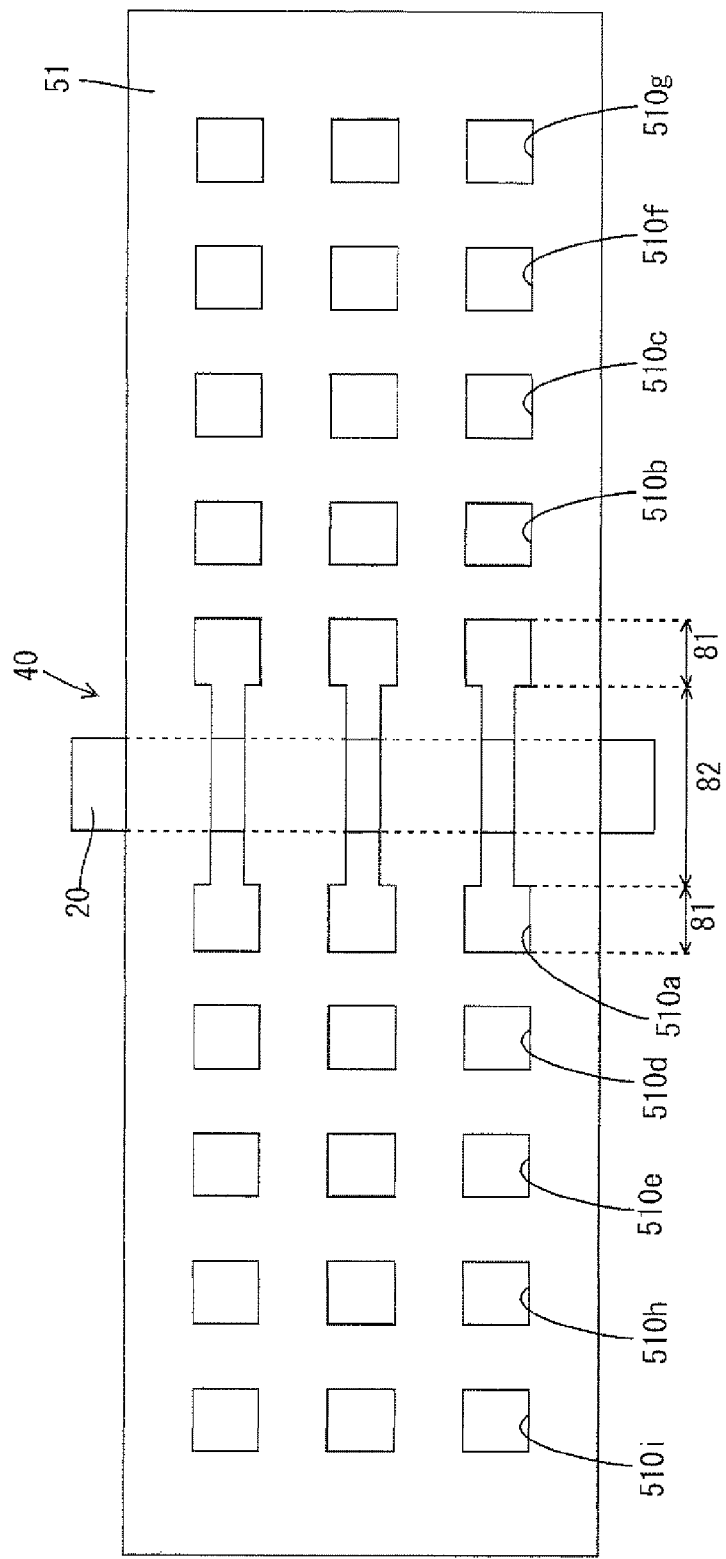
FIG. 14 is a diagram schematically showing another modification of the cutout portions.

(5) In the above embodiment, two columns of cutout portions 510b and the like are provided on each side of the slit portions 510a and the like. However, any number of columns can be provided as long as the wiring resistance is within the permissible limits. For example, four columns may be provided on each side as shown in FIG. 14.

Figure 15:
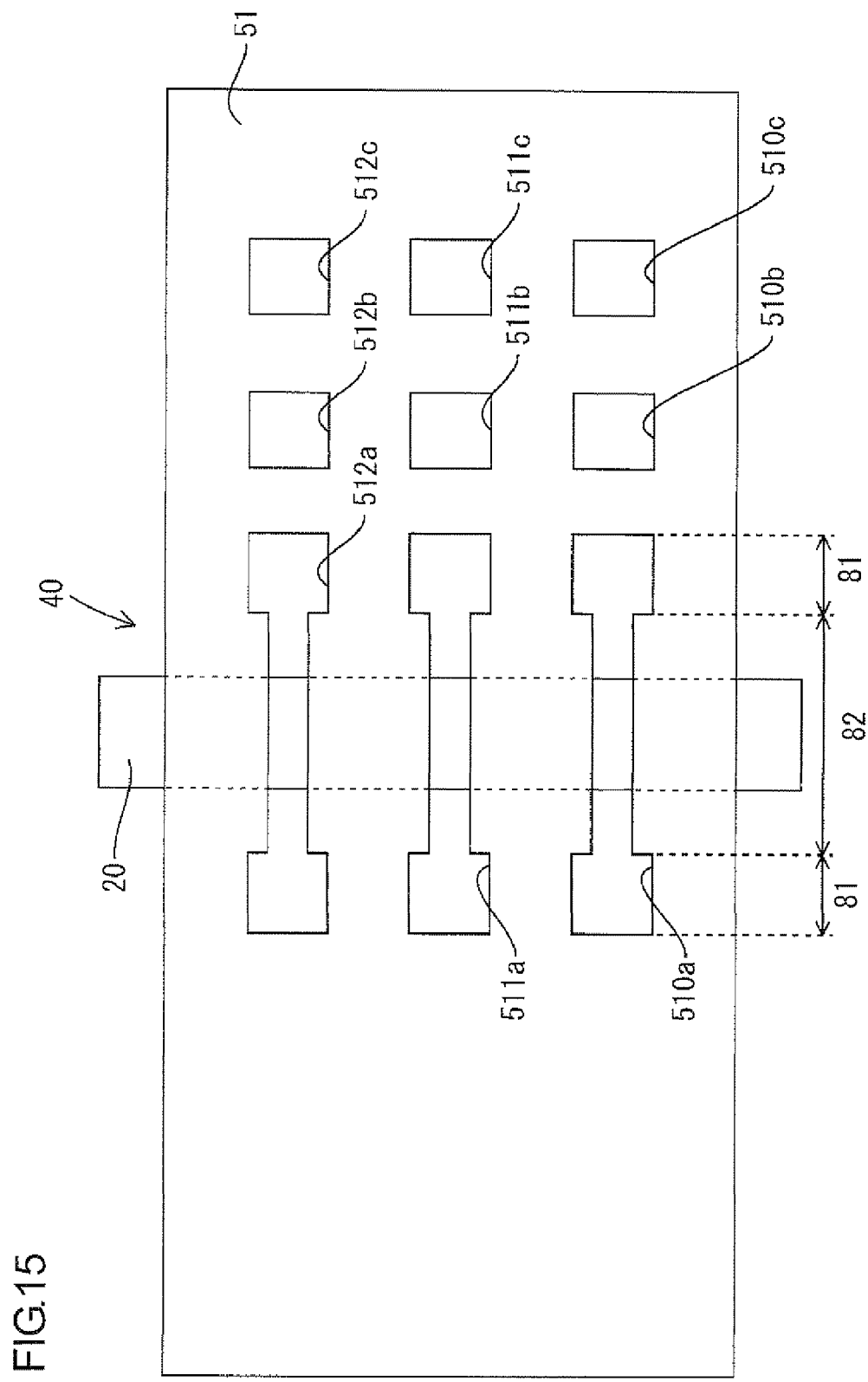
FIG. 15 is a diagram schematically showing another modification of the cutout portions.

(6) In the above embodiment, the cutout portions 510b, 510d and the like are arranged on both sides of the slit 510a. However, the cutout portions 510b and the like may be arranged on one side of the slit 510a as shown in FIG. 15, for example.

Figure 16:
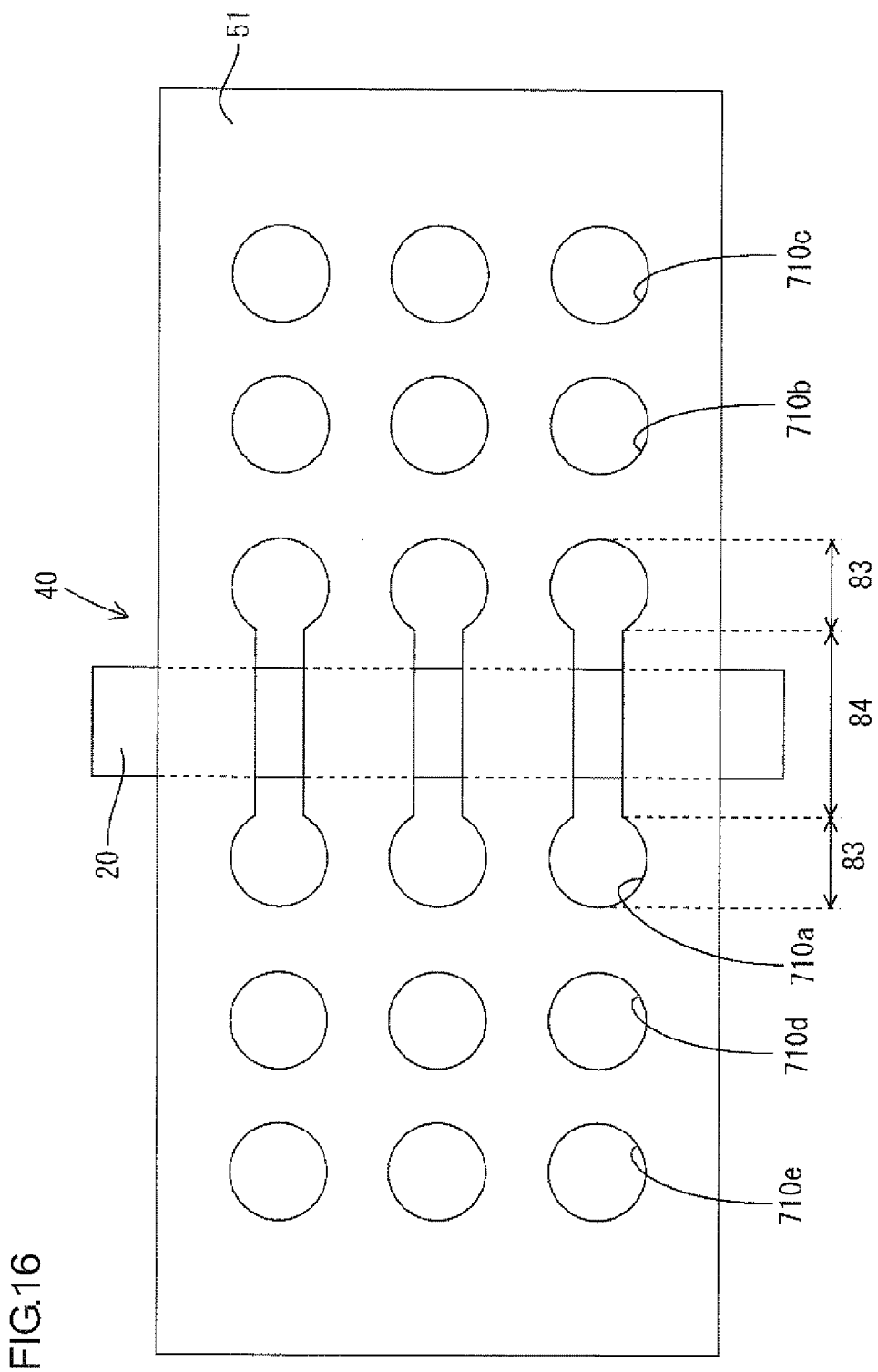
FIG. 16 is a diagram schematically showing another modification of the slit portions or the cutout portions.

(7) In the above embodiments, the end areas 81 of the slit portions 210a and the like, or the end areas 81 of the slit portions 510a and the like and the cutout portions 510b and the like are each formed into a rectangular shape. However, each of the end areas 83 of slit portions 710a and the like, or cutout portions 710b and the like may be formed into a circular shape as shown in FIG. 16, for example, as long as the opening size thereof is set to be sufficiently larger than the laser beam width. Further, any combination thereof may be possible.

Figure 17:
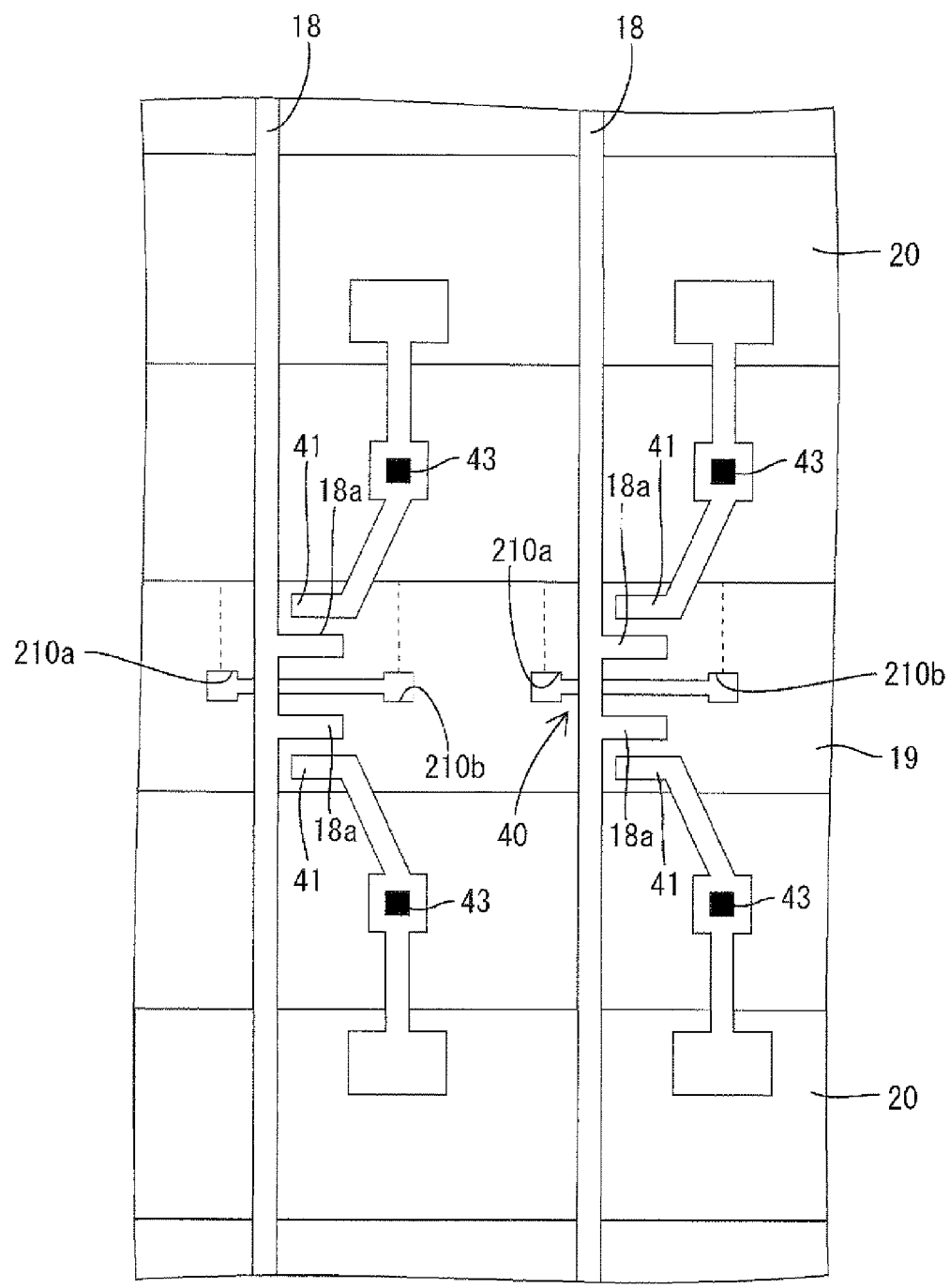
FIG. 17 is a diagram schematically showing another modification of the slit portions.
Figure 18:
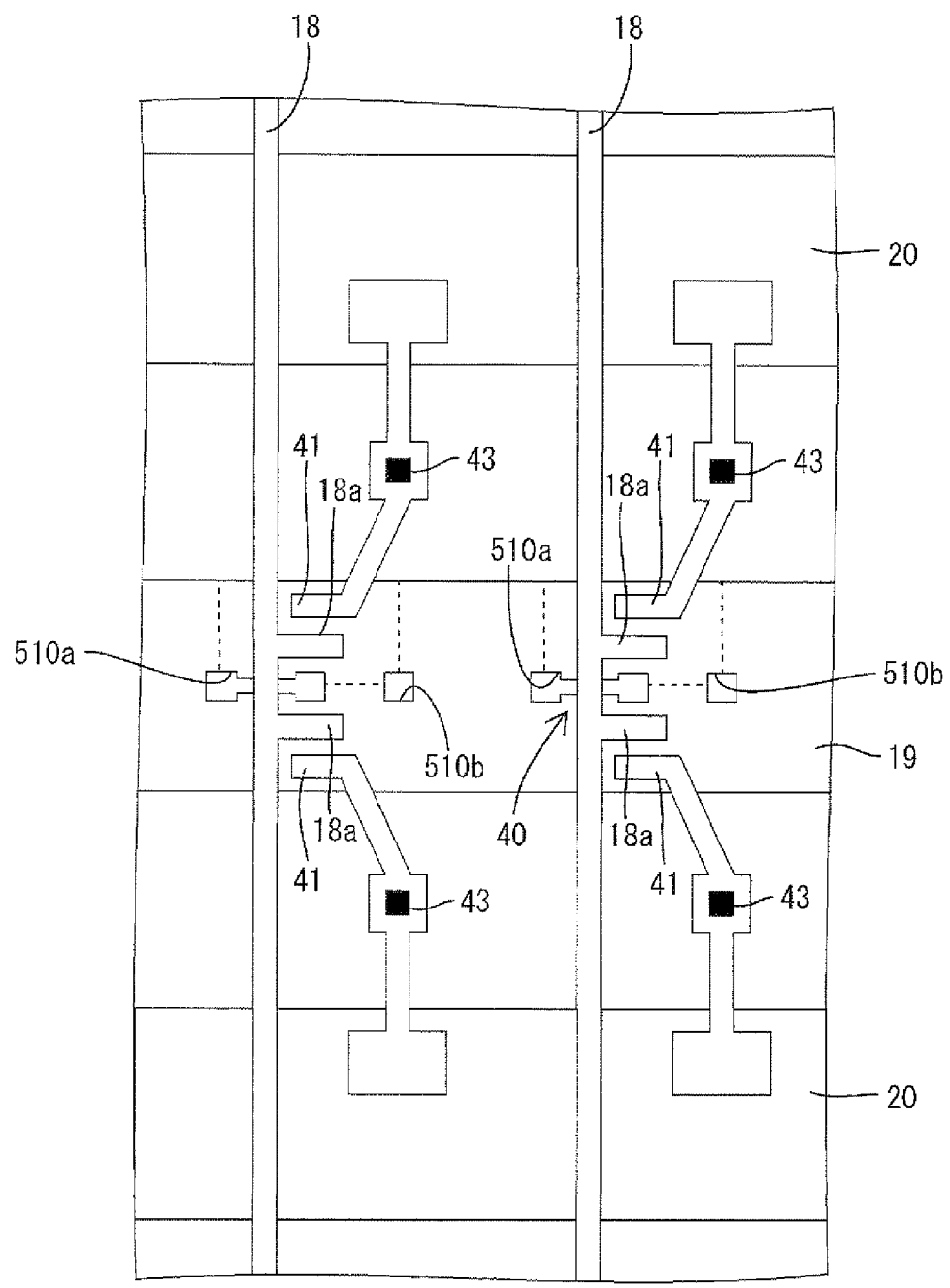
FIG. 18 is a diagram schematically showing another modification of the slit portions and the cutout portions.

(8) In the above embodiments, the slit 210a is formed in a section at which a peripheral wiring line 21 and a storage capacitor line 20 intersect each other. However, a slit 210a may be formed in a section (i.e., a crossover section 40) at which a data line 18 and a scanning line 19 intersect each other, as shown in FIG. 17, for example. In this case, when the data line 18 and the scanning line 19 are short-circuited due to intrusion of a foreign substance, the short circuit spot can be cut off (or isolated) by laser irradiation along dashed lines shown in FIG. 17. Alternatively, a slit 510a and a cutout portion 510b may be provided, as shown in FIG. 18. Also in this case, when the data line 18 and the scanning line 19 are short-circuited due to intrusion of a foreign substance, the short circuit spot can be cutoff (or isolated) by laser irradiation along dashed lines shown in FIG. 18. In FIGS. 17 and 18, Symbol 18a designates a source electrode, while Symbol 41 designates a drain electrode. When a scan signal is supplied to a gate electrode (not shown) from the scanning line 19, the source electrode 18a is conductively connected to the drain electrode 41 so that a data signal is supplied to the drain electrode 41 from the source electrode 18a. The data signal is transmitted to the pixel electrode (not shown) via a contact 43.

The invention claimed is:

1. A display device comprising:
a first conductive layer; and
a second conductive layer arranged across an insulating layer from said first conductive layer, wherein:
an overlap section at which said first conductive layer and said second conductive layer overlap each other is provided, said overlap section being in a peripheral area of the display device;
at least one of said first conductive layer and said second conductive layer includes a repeating pattern of slits that is arranged in said overlap section; and
a width of slits in said repeating pattern of slits is set to be smaller at a medial area except both end areas of said slit, than at the both end areas.

2. A display device as in claim 1, wherein said both end areas of each slit in the repeating pattern of slits are formed to have a rectangular shape on which each side thereof is set to a length between 6.0 μm and 10.0 μm, and said medial area is formed to have a slit width between 4.0 μm and 6.0 μm.

3. A display device comprising:
a first conductive layer; and
a second conductive layer arranged across an insulating layer from said first conductive layer, wherein:
an overlap section at which said first conductive layer and said second conductive layer overlap each other is provided;
at least one of said first conductive layer and said second conductive layer includes a slit portion that is arranged in said overlap section;
a width of said slit portion is set to be smaller at a medial area except both end areas of said slit portion, than at the both end areas; and
wherein said at least one of said first conductive layer and said second conductive layer, on which said slit portion is provided, includes a cutout portion located at a predetermined distance from said slit portion.

4. A display device as in claim 3, wherein said slit portion includes a plurality of slit portions arranged parallel to one another, and said cutout portion includes cutout portions arranged to correspond to said respective slit portions.

5. A display device as in claim 3, wherein said cutout portion is linearly aligned with said slit portion.

6. A display device as in claim 3, wherein said cutout portion includes a plurality of cutout portions arranged along a longitudinal direction of said slit portion.

7. A display device as in claim 3, wherein said cutout portion includes cutout portions arranged in an array of rows and columns.

8. A display device as in claim 3, wherein said cutout portion is formed to have a rectangular shape on which each side thereof is set to a length between 6.0 μm and 10.0 μm.

* * * * *